United States Patent [19]

Ueno et al.

[11] 4,111,161
[45] Sep. 5, 1978

[54] ENGINE OPERATED ON HYDROGEN-SUPPLEMENTED FUEL

[75] Inventors: Zene Ueno, Fuchu; Akira Morita, Tokyo; Shigeo Iwaki, Akishima; Tadahiko Nagaoka, Tokorozawa; Tokuich Inagaki, Yokohama, all of Japan

[73] Assignee: Nissan Motor Company, Limited, Japan

[21] Appl. No.: 624,921

[22] Filed: Oct. 22, 1975

[51] Int. Cl.² .............................................. F02B 43/08
[52] U.S. Cl. .................. 123/3; 123/DIG. 12; 123/120
[58] Field of Search ................ 123/DIG. 12, 3, 1 A, 123/120, 141, 30 C, 188 S, 188 M, 119 E

[56] References Cited

U.S. PATENT DOCUMENTS

| | | | |
|---|---|---|---|
| 1,856,328 | 5/1932 | French | 123/30 C |
| 2,183,674 | 12/1939 | Erren | 123/DIG. 12 |
| 2,593,769 | 4/1952 | Kollsman | 123/188 S |
| 2,937,634 | 5/1960 | Kelszaux | 123/DIG. 12 |
| 3,407,790 | 10/1968 | Antonsen | 123/120 |
| 3,678,905 | 7/1972 | Diehl | 123/188 M |
| 3,908,606 | 9/1975 | Toyoda | 123/DIG. 12 |
| 3,911,873 | 10/1975 | Dave | 123/188 M |
| 3,923,027 | 12/1975 | Daniels | 123/141 |
| 3,946,711 | 3/1976 | Wigal | 123/119 E |
| 3,954,092 | 5/1976 | Polaner | 123/120 |
| 3,970,054 | 7/1976 | Henault | 123/DIG. 12 |

FOREIGN PATENT DOCUMENTS 531,430  1/1941  United Kingdom ............. 123/3

*Primary Examiner*—Ronald H. Lazarus
*Attorney, Agent, or Firm*—Robert E. Burns; Emmanuel J. Lobato; Bruce L. Adams

[57] ABSTRACT

A lean air-fuel mixture and hydrogen gas are introduced into the combustion chamber so that high concentrations of hydrogen form about the spark plug and combustion chamber walls.

4 Claims, 5 Drawing Figures

ENGINE OPERATED ON HYDROGEN-SUPPLEMENTED FUEL

BACKGROUND OF THE INVENTION

This invention relates to a spark ignition internal combustion engine operated on a lean air-fuel mixture supplemented with hydrogen gas, and to a method of operating the same.

As is well known in the art, internal combustion engines that are operated on over lean air-fuel mixtures emit low levels of nitrogen oxide ($NO_x$), carbon monoxide (CO) and hydrocarbons (HC). However, internal combustion engines operated on the over lean mixtures (for example, air-to-fuel ratio; 18 or more: 1) usually misfire and therefore stable operation is not possible. The misfiring results from failure to ignite the lean mixture which has low fuel particle density and consequencial poor flame front movement in the combustion chamber after ignition.

To overcome the above mentioned drawback, operation of the engine on over lean mixtures supplemented with hydrogen gas has been proposed. In this operation, flammable hydrogen gas can be diffused among fuel particles in the combustion chambers and therefore misfiring is prevented and the flame front movement improved.

The prior art engine operation on the hydrogen-supplemented fuel has contributed to lowering the emission levels of $NO_x$ and CO, however, a problem has been encountered in that the air-fuel mixture adjacent the inner wall of the combustion chambers is not effectively burned and therefore relatively high levels of unburned hydrocarbons are emitted. This results from the fact that the temperature of the inner wall surface of the combustion chambers is not increased due to the low calorific value of the lean mixture, and release or absorption of heat generated by combustion through the walls of the combustion chambers.

SUMMARY OF THE INVENTION

It is, therefore, a principal object of the present invention to provide an improved spark-ignition internal combustion engine and an improved method of operating the engine to enable stable operation of the engine on over lean air-fuel mixtures with very low noxious gases emissions.

It is another object of the present invention to provide an improved spark-ignition internal combustion engine operated on over lean air-fuel mixtures supplemented with hydrogen gas and an improved method of operating the engine whereby the gas is supplied into the vicinity of the spark plug and the inner wall surface of the combustion chamber, thereby promoting smooth clean combustion of the entire air-fuel mixture.

BRIEF DESCRIPTION OF THE DRAWINGS

Other objects and features of the improved internal combustion engine and the method of operating same in accordance with the principle of the invention will become more apparent from the following description taken in conjunction with the accompanying drawings in which like reference numerals and characters designate corresponding parts and elements and in which.

DESCRIPTION OF THE PREFERRED EMBODIMENTS

Figure 1:
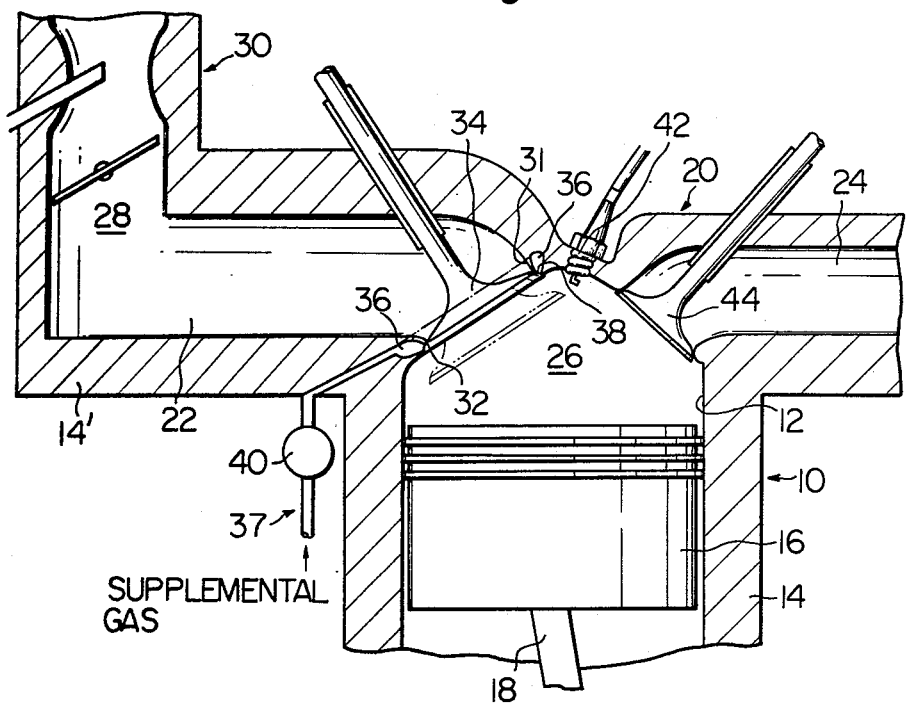
FIG. 1 is a vertical transverse section view showing an internal combustion engine having a first preferred embodiment according to the principle of the invention, this view showing an annular gas passage for providing supplemental gas into a combustion chamber.

Referring now to FIG. 1, there is shown a first preferred embodiment according to the principle of the present invention, in which a spark-ignition internal combustion engine of the four-cycle valve-in-head type is designated by the reference numeral 10. The engine 10 is a multi-cylinder internal combustion engine, only one cylinder 12 of which is shown in the vertical transverse section in FIG. 1. The cylinder 12 is formed in the body casting portion 14 of the engine block (not shown). Reciprocally disposed in the cylinder 12 is a piston 16 which is operatively connected by a connecting rod 18 to a crank arm of a crankshaft (they are not shown).

Covering the upper portion of the cylinder 12 is a cylinder head structure 20 which is formed with an intake passage 22 and an exhaust discharge passage 24. The cylinder head structure 20 defines therein a hemispherical combustion chamber 26. The intake passage 22 is connected at one end thereof to the induction passage 28 of a carburetor 30 and at the other end thereof to the combustion chamber 26 through an intake port 31 which is defined by an annular intake valve seat 32. The carburetor 30 is set to produce an extremely lean air-fuel mixture having an air-fuel ratio of about 18 or more:1. The fuel used in this instance is hydrocarbon fuel such as gasoline or light oil. An intake valve 34 seated on the valve seat 32 is arranged to move to the position shown in broken lines to open the intake port. Shown adjacent the intake valve seat 32 and in the body casting portion 14' of the cylinder head structure 20 is an annular gas passage 36 which constitutes part of supplemental gas supply means 37 and is formed annularly along the valve seat 32 and communicates with the intake port 31 through an annular aperture 38 formed through the surface of the valve seat 32. The annular gas passage 36 is connected to a check valve 40 which in turn is connected to a supplemental gas source which supplies hydrogen gas, or a mixed gas of hydrogen gas and other gases such as carbon monoxide gas (CO) or carbon dioxide gas ($CO_2$). A spark plug 42 or igniting means is disposed through the body casting portion 14' and its electrode (no numeral) projects into the combustion chamber 26 adjacent to the intake port.

An exhaust valve 44 is seated on the exhaust valve seat (no numeral) located at one end of the exhaust discharge passage 24 and is arranged to open to allow the burned gas produced in the combustion chamber 26 to exhaust from the engine 10.

With the arrangement mentioned above, when the intake valve 34 is open and the lean air-fuel mixture is introduced during the suction stroke of the engine 10, the supplemental gas in the annular gas passage 36 is injected from the annular aperture 38 into the air-fuel mixture passing through the intake port 31. Then, the supplemental gas flows into the combustion chamber 26 along the inner wall of the combustion chamber 26 enveloping therein the lean air-fuel mixture. Therefore, the hydrogen gas concentration is higher adjacent the inner wall surface of the combustion chamber and in the vicinity of the spark plug 42 compared with the central portion of the combustion chamber 26. Accordingly, the air-fuel mixture adjacent the inner wall surface of the combustion chamber is effectively burned as a result of the high concentration of flammable hydrogen gas mixed therewith. This occurs even in a quench area where a flame will normally extinguish and therefore generation of unburned hydrocarbons due to a cooled inner wall is prevented. In addition, the high concentration hydrogen gas adjacent the spark plug 42 provides reliable ignition of the lean air-fuel mixture around the spark plug 42 via the so-called stratified charge of the hydrogen gas and air-fuel mixture. Flame front movement in the combustion chamber 26 is readily carried out since the flammable hydrogen gas is dispersed through the combustion chamber 26.

Figure 2:
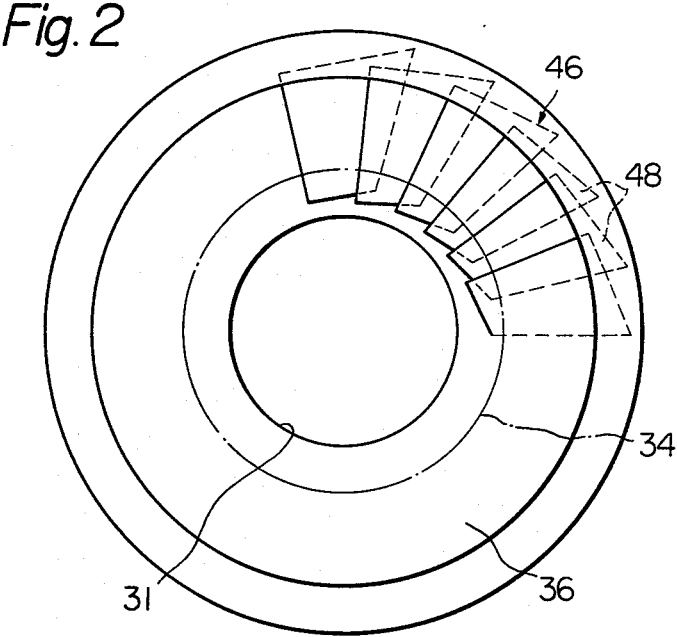
FIG. 2 is a plan view of an annular louver assembly which may be disposed within the annular gas passage in FIG. 1.

It will be noted that an annular louver assembly 46 as shown in FIG. 2 may be disposed within the annular gas passage 36 for the purpose of providing the swirling movement to the supplemental gas to be introduced into the combustion chamber 26. The swirled supplemental gas effects better mixing between the hydrogen gas and the lean air-fuel mixture while providing a high concentration of hydrogen adjacent the inner wall surface of the combustion chamber 26. As seen, the louver assembly 46 has a plurality of inclined vanes 48 which are annularly aligned along the annular gas passage 36.

Figure 3:
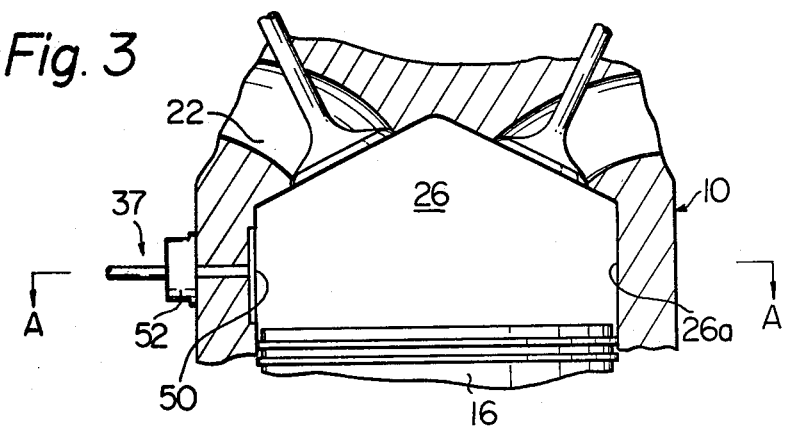
FIG. 3 is a vertical transverse section view showing an internal combustion engine having a second preferred embodiment according to the principle of the invention.
Figure 4:
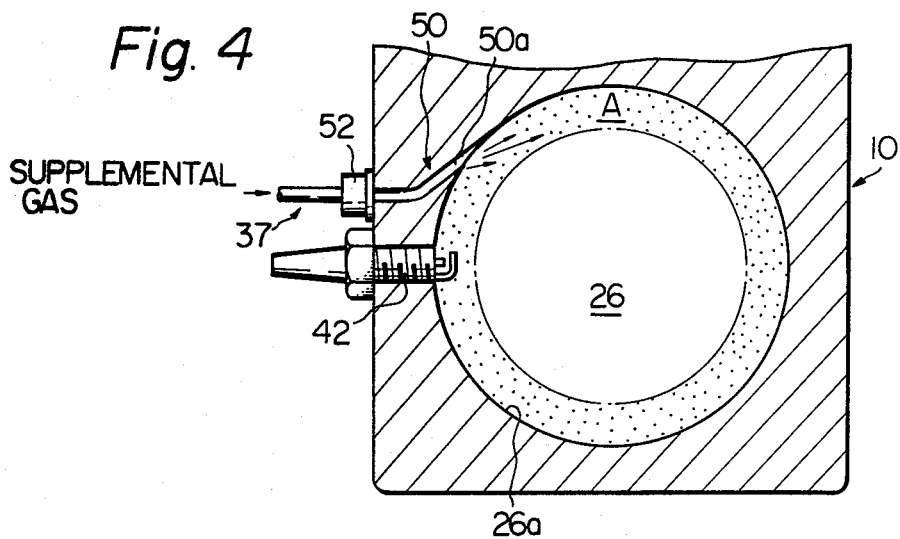
FIG. 4 is a plan view taken along a section line A—A in FIG. 3.

FIGS. 3 and 4 illustrated a second preferred embodiment according to the principle of the present invention in which a similar engine construction to that in FIG. 1 is shown except for the location of the supplemental gas supply means 37 and the spark plug 42. As shown, a gas injection nozzle 50 forming part of the supplemental gas supply means 37 is formed within the body casting portion of the engine 10. The gas injection nozzle 50 has a straight portion 50a which is open at one end thereof through the cylindrical wall 26a of the combustion chamber 26 and connected at the other end thereof to a supplemental gas injection device 52. The device 52 is in turn connected to the supplemental gas source and injects the supplemental gas at a pressure higher than that in the combustion chamber 26. It should be noted that the axis of the straight portion 50a of the injection nozzle 50 is approximately tangential with respect to the circumference of the inner cylindrical wall 26. The spark plug 42 is disposed through the cylindrical wall 26a and its electrode projects into the combustion chamber 26 adjacent the inner wall of the combustion chamber 26. With this arrangement, since the supplemental gas is injected tangentially into the combustion chamber 26 along the inner peripheral surface of the cylindrical wall 26a, the hydrogen gas concentration adjacent the cylindrical wall surface 26a is higher than at the central portion of the combustion chamber 26. Therefore, the layer A having a relatively high hydrogen gas concentration is formed adjacent the inner cylindrical wall surface 26a and the spark plug 42 to effectively burn hydrocarbons in the combustion chamber 26 in the similar manner as described with reference to FIG. 1.

Figure 5:
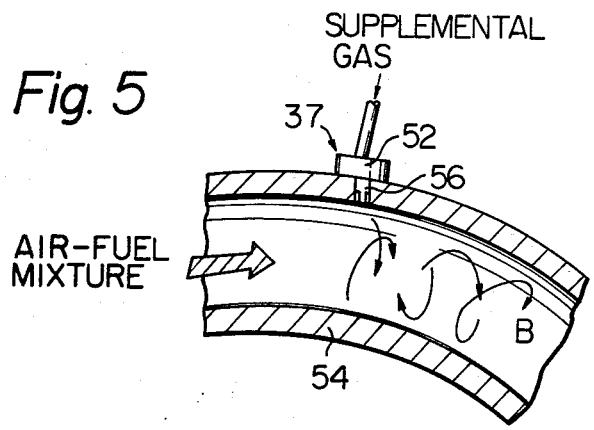
FIG. 5 is a sectional view showing a runner of an intake manifold of an internal combustion engine having a third preferred embodiment in accordance with the invention.

FIG. 5 illustrates a third preferred embodiment in accordance with the principle of the present invention in which a gas injection nozzle 56 forming part of supplemental gas supply means 37 is disposed through the wall of a runner 54 of an intake manifold (not shown). The gas injection nozzle 56 communicates via the supplemental gas injection device 52 with the supplemental gas source. It should be noted that the axis of the injection nozzle 56 is so oriented that the injected supplemental gas is swirled along the inner circumference of the runner 54 as indicated by arrows B. The axis of the injection nozzle 56 may be approximately tangential with respect to the inner circumference of the runner 54. In this instance, the lean air-fuel mixture from the carburetor flows inside of the rotationally flowing supplemental gas and therefore the layer of relatively high hydrogen gas concentration will be formed at the portion adjacent to the inner wall of the combustion chamber and at the portion in the vicinity of the spark plug (they are not shown in FIG. 5).

As is apparent from the foregoing description, the engine constructed and the method of operating same in accordance with the present invention make possible considerably lower emission levels of $NO_x$ and CO. They also make possible prevention of unburned HC generated in the quench areas since a relatively high concentration of flammable hydrogen gas is ignited by the spark plug and burns adjacent the inner wall surface of the combustion chamber to reliably ignite the over lean air-fuel mixture adjacent the hydrogen rich layer. In addition, according to the present invention, combustion in the combustion chambers is smooth and therefore stable engine operation is possible even if the engine is operated on an ultra-lean air-fuel mixture since the flame front movement in the combustion chamber is rapid and smooth due to the fact that combustion speed of air-fuel mixture containing hydrogen gas is considerably higher than that containing no hydrogen gas, and so-called stratified combustion is achieved in the combustion chamber.

What is claimed is:

1. An internal combustion engine having a combustion chamber defined between a surface of a cylinder head and a piston, comprising:
   lean air-fuel mixture supply means for supplying air-fuel mixture leaner than stoichiometric into the combustion chamber through an intake port formed in the cylinder head;
   means for defining an annular hydrogen gas supply passage in the cylinder head, said hydrogen gas supply passage being formed annularly around an intake valve seat secured to the cylinder head and communicable with the intake port through the surface of the intake valve seat;
   a hydrogen gas source operatively connected to said annular hydrogen gas supply passage; and
   a spark plug disposed through the cylinder head and in the combustion chamber, said spark plug being located adjacent the wall surface of the cylinder head defining the combustion chamber.

2. An internal combustion engine as claimed in claim 1, further comprising an annular louver assembly disposed in said annular hydrogen gas supply passage to generate a swirl of hydrogen gas as it enters the combustion chamber, and said louver assembly having a plurality of inclined vanes annularly aligned along the annular hydrogen gas supply passage.

3. An internal combustion engine having a combustion chamber defined between a surface of a cylinder head and a piston, comprising:
- a carburetor operatively connected through an intake port to the combustion chamber, said carburetor providing an air-fuel mixture leaner than stoichiometric;
- means defining an annular hydrogen gas supply passage in the cylinder head, said hydrogen gas supply passage being formed annularly around an intake valve seat secured to the cylinder head and communicatable with the intake port through the surface of the intake valve seat;
- a hydrogen gas source operatively connected to said annular hydrogen gas supply passage; and
- a spark plug disposed through the cylinder head and in the combustion chamber, said spark plug being located adjacent the wall surface of the cylinder head defining the combustion chamber.

4. A method of operating an internal combustion engine having a combustion chamber defined between a surface of cylinder head and a piston, comprising:
- supplying air-fuel mixture leaner than stoichiometric into the combustion chamber through an intake port formed in the cylinder head;
- supplying hydrogen gas into an annular hydrogen gas supply passage formed in the cylinder head, said hydrogen gas supply passage being located around an intake valve seat and being communicable with the intake port through the surface of the intake valve seat;
- injecting hydrogen gas from said annular hydrogen supply passage into the intake port so as to form, adjacent the wall surface of the cylinder head, an air-fuel mixture layer having a hydrogen gas concentration higher than that of the central portion of the combustion chamber; and
- igniting said air-fuel mixture layer formed adjacent the wall surface of the cylinder head by a spark generated from a spark plug disposed adjacent the wall surface of the cylinder head.

* * * * *